United States Patent
Lee

(10) Patent No.: US 7,451,223 B2
(45) Date of Patent: Nov. 11, 2008

(54) SYSTEM FOR CONTROLLING REMOTE INTEGRATED CIRCUIT AND METHOD FOR OPERATING THE SAME

(75) Inventor: Jae Kyung Lee, Taegu-shi (KR)

(73) Assignee: LG Electronics Inc., Seoul (KR)

( * ) Notice: Subject to any disclaimer, the term of this patent is extended or adjusted under 35 U.S.C. 154(b) by 1764 days.

(21) Appl. No.: 09/911,497

(22) Filed: Jul. 25, 2001

(65) Prior Publication Data

US 2002/0013634 A1   Jan. 31, 2002

(30) Foreign Application Priority Data

Jul. 28, 2000   (KR)  .............................. 2000-43712

(51) Int. Cl.
  *G06F 11/00*  (2006.01)
  *G06F 15/16*  (2006.01)
  *G06F 15/173*  (2006.01)

(52) U.S. Cl. ..................... 709/228; 709/224; 714/5; 714/25; 714/57

(58) Field of Classification Search ............ None
See application file for complete search history.

(56) References Cited

U.S. PATENT DOCUMENTS

| 6,134,680 A * | 10/2000 | Yeomans ............... 714/57 |
| 6,401,218 B1 * | 6/2002 | Linam et al. ........... 714/25 |
| 6,594,786 B1 * | 7/2003 | Connelly et al. ........ 714/50 |
| 6,745,343 B1 * | 6/2004 | Barenys et al. ......... 714/36 |

* cited by examiner

*Primary Examiner*—F. Zeender
*Assistant Examiner*—Ramsey Refai
(74) *Attorney, Agent, or Firm*—Ked & Associates, LLP

(57) ABSTRACT

A system for more effective control and management on remote Integrated Circuit (IC) is disclosed. In order to achieve this, there is provided a system for controlling remote IC using Internet and a method for operating the same, the system includes a network for a manufacturer who manufactures products containing IC and has managing system for managing the products, being connected to each IC using an identification number of IC, respectively; an IC designer network having a corresponding program for IC setup operation that helps the designer to design and sell the IC to the manufacturer; and, a relay service company network having a plurality of manufacturer network and a plurality of IC designer network connected to on-line, and a corresponding URL (Uniform Resource Locator) data of each IC designer network that enables the relay service company to connect to a corresponding IC designer network whenever there is a data request from a manufacturer network and to exchange data each other.

12 Claims, 9 Drawing Sheets

SYSTEM FOR CONTROLLING REMOTE INTEGRATED CIRCUIT AND METHOD FOR OPERATING THE SAME

BACKGROUND OF THE INVENTION

1. Field of the Invention

The present invention relates to an electronic part control system and a method for operating the same, and more particularly, to a system for controlling remote integrated circuit and method for operating the same in on-line.

2. Background of the Related Art

Generally, IC (Integrated Circuit) is a basic element of a semiconductor and mainly controls operation of every component therein.

FIG. 1 illustrates a general construction of a television (TV) among other electronic appliances and a connection state of network of a manager for managing the TV manufacture.

As shown, the typical construction of a TV is comprised of sound part, display part and micom part.

Here, the sound part comprises various kinds of parts that are associated with sound, e.g., tuner part 11, multichannel sound control part 12, and sound control part 13. The display part comprises different kinds of parts that are associated with display, e.g., image control part 14, CPT (Color Picture Tube) control part 15, and CPT part 16. Each part illustrated here has its own IC for controlling. The IC comprises a small range of register in order to facilitate operation of each part, and communicates with other IC registers through a bus line 17 to control the corresponding operation.

Moreover, the micom part 18 controls IC of each part so that an entire product can be operated in a harmony.

In the actual manufacturing process for a TV with the construction described above, the ICs for controlling operation among every part aforementioned require setup beforehand. The setup process is now detailed below.

To begin with, after putting the corresponding parts together for a product, setting is performed to connect the parts to one another. Simultaneously, to set up each part, separate controlling computer 20 for a setup manager is connected to system 10 of each product.

Afterwards, the setup manager uses the controlling computer 20 and carries out register setup of the IC by inputting data to a relevant IC through the bus line 17 of a corresponding product.

For example, if a setup manager wishes to change an IC register for the tuner part 11, he or she first sets up the micom part 18 of a corresponding product into an operator controlling system. At this state, the setup manager operates the controlling computer 20 and connects to IC of a relevant tuner part 11 through the micom part 18, and at the same time, changes register value of the corresponding IC within a range the manager intended.

At this time, each IC register value is either one that a setup manager has already informed of or one that is provided on a manual by the IC manufacturer based on each IC setup data. In addition, the range of the corresponding IC register value is determined on basis of the setup range for register value in a harmony with the above IC and IC of other associated parts.

However, considering that each IC is usually designed or manufactured by a different designer or manufacturer, it becomes easy to understand why a setup manager often has difficult time to set a precise register range of each IC. In other words, no matter how precisely does the setup manager operate IC setup based on a corresponding manual, each IC does not readily adapt to other ICs, therefore, it is practically required to obtain an appropriate setup value.

Especially, if there is an error in setup of the corresponding IC, a setup manager has to find out what exactly went wrong and correct the problem accurately, which are considered to be very difficult to do and require a great deal of skills from the setup manager in each different case.

Previously, if the same problem as above happened, an IC setup manager used to call the corresponding IC designer to change the relevant IC setup or personally visit the IC designer and ask to correct the setting error.

Unfortunately, the ICs are generally imported from foreign countries and the designers of the same live abroad also. Accordingly, visiting an IC designer for correcting an error occurred during a corresponding IC setup not only wasted too much time of the IC designer but also increased a lot of costs in doing so.

Moreover, the above-described IC error is not limited to a certain industry. Rather, any manufacturer who makes a similar or identical product using the above IC experiences the same problem at least once.

Since the lack of information share concerning how to deal with the problem, many attempts to solve the problem only caused a lot of loss in time and cost. That is, even though many agree that these problems do not occur among TV manufacturers only, but every manufacturer who uses IC, it has been unsuccessful to effectively resolve this concern and any particular solution has not been discovered so far.

SUMMARY OF THE INVENTION

Accordingly, the present invention is directed to a system for controlling remote integrated circuit and method for operating the same that substantially obviates one or more problems due to limitations and disadvantages of the related art.

An object of the present invention is to provide a controlling system of remote integrated circuit using the internet in order to minimize time loss of an IC setup manager and visitation of a corresponding IC designer with the IC users whenever there is an error on IC setup.

Another object of the present invention is to provide a controlling system of remote integrated circuit using the internet in order to help an IC designer to do the same management on the remote IC setup through the internet.

Still another object of the present invention is to provide a remote controlling system to prevent repetition of the same operation by an IC designer on the request of IC setup data having the same content, by sharing the specifics on an error during each IC setup with a plurality of other IC users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for operating system for controlling remote integrated circuit includes a network for a manufacturer having a management system for managing from the manufacturing a product with IC to connecting each IC using its own specific code, respectively; a network for an IC designer who designs and supplies IC to the above manufacturer, and operates the IC setting for the manufacturer; a network for a relay service company who enables data exchange between networks based on the corresponding URL (Uniform Resource Locator) data of each IC designer network, helping a manufacturer network to be connected to an IC designer network having a relevant program upon the request.

Here, identification number of IC the above manufacturer network manages is preferably a manufacturing number provided by each IC manufacturer.

The relay service company network includes database (DB) for classifying and saving data of requiring IC setup from the manufacturer network and setup problem solving data from an IC designer upon the request aforementioned; and, web server connected to the DB for providing data saved in the DB on a web page whenever there is a request for the data in the DB.

Preferably, the above relay service company network further comprises file server that is connected to the data saving DB, and providing data in the DB in a designated format of file upon the request of the data saved in the DB.

Also, the IC designer network includes DB for saving data regarding a distributor of the IC; DB for saving data of each IC on sale; and web server with an administration site for providing every kind of IC data for manufacturers and receiving requests for data regarding the corresponding IC.

In another aspect of the present invention, a method for system for controlling remote IC using internet comprises steps of transmitting data on the error made during the corresponding IC setup to make each IC adopt to a product to relay service company network through the corresponding manufacturer network; analyzing and modifying the corresponding data transmitted from the IC designer network on the setup error; transmitting the modified data to the transmit service company network; transmitting the data transmitted from the relay service company network to the manufacturer network; and, using the transmitted data described above, re-performing setup for the corresponding IC through a management system in the manufacturer network.

Here, a more preferable method for operating the system further comprises a step for classifying and saving data regarding the content of IC error and solution therefor in the DB when the relay service company network relays the transmitted data.

More preferably, when there is a request for data, IC setup is transmitted to a relay service company network from each manufacturer network, the relay service company network carries out a data retrieval to confirm whether or not there is the relevant data saved in DB with the request, and if there is, the system provides the data to the corresponding manufacturer network.

Therefore, any error that is made while setting of a product with every kind of IC according to the present invention can be fixed by the corresponding IC designer, and through this procedure, the collected data can be shared with others, which consequently prevents any IC setting error aforementioned. From this point of view, the present invention provides a more effective method for controlling and managing remote IC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings (FIGS. 2-9).

Figure 1:
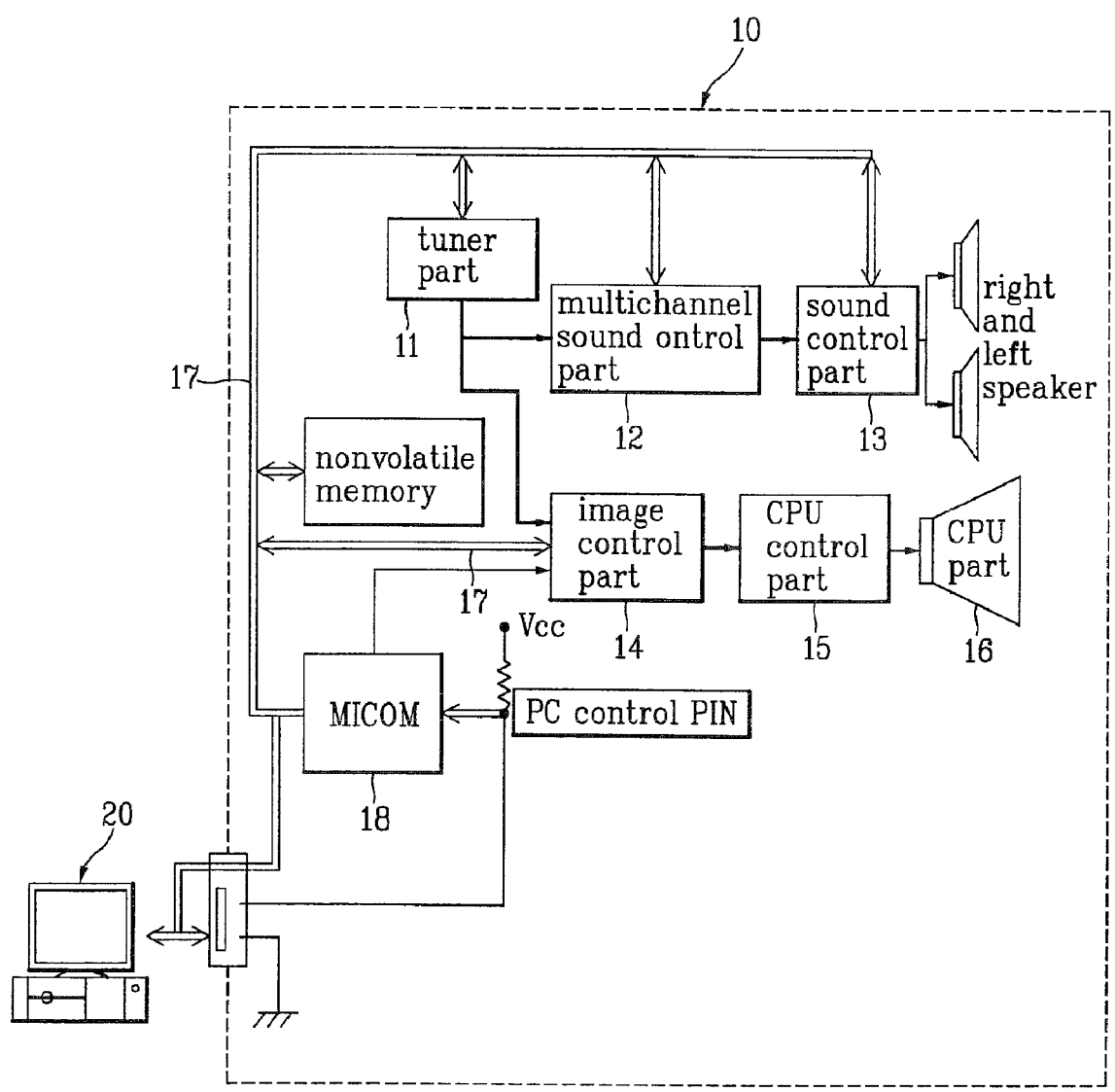
FIG. 1 illustrates a structural view of relationship between general electronic appliance parts and a managing system for setup of the same.
Figure 2:
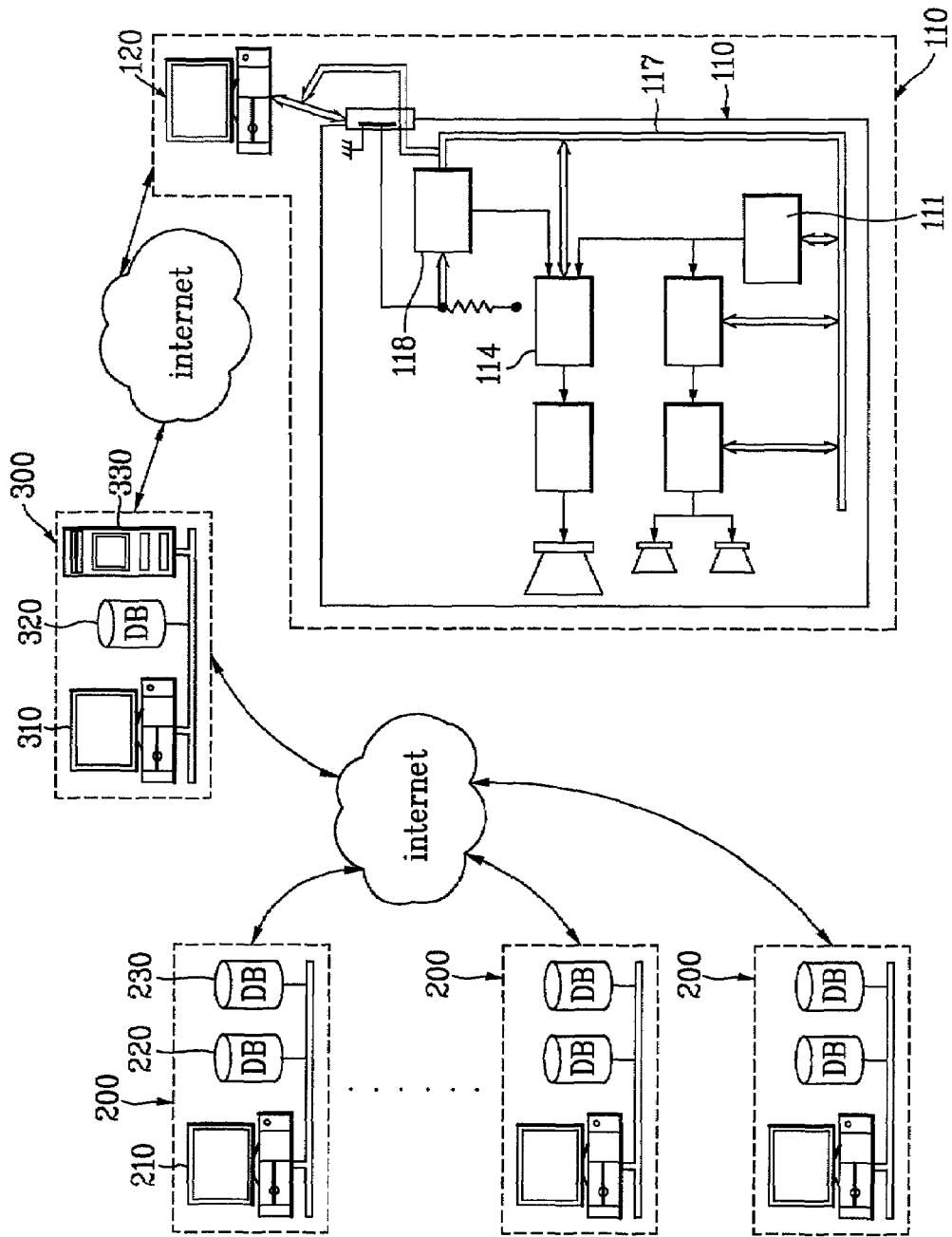
FIG. 2 illustrates a structural view of a remote control system according to a first example of the present invention.
Figure 3:
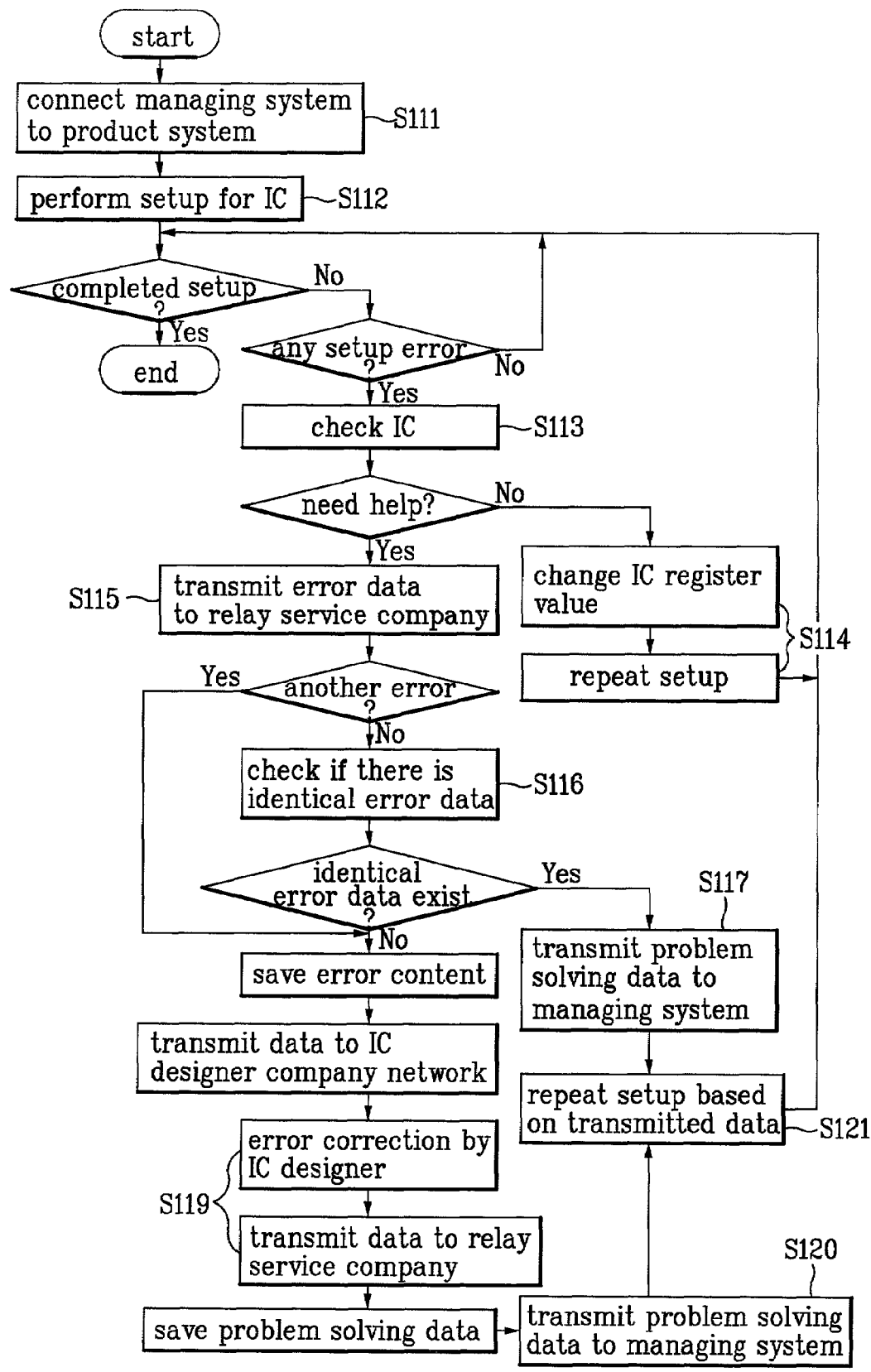
FIG. 3 is a flow chart illustrating a method for operating remote control system according to a first example of the present invention.

First of all, FIG. 2 is a structural view of a remote control system according to a first example of the present invention, and FIG. 3 is a flow chart to illustrate a method for operating remote control system according to the first example of the present invention.

The first example of the remote control system comprises manufacturer network 100, the manufacturer producing every kind of products; IC designer network 200, the designer designing IC (Integrated Circuit) for the products; and, relay service company network 300, the company relaying the manufacture network and a plurality of IC designer networks connected to online, respectively, for data exchange.

Here, the manufacturer network 100 includes managing system 120 that performs setup for IC of each product according to the operation of a setup manager.

The managing system is connected to micom of each product, and transmits a signal for IC control of the corresponding part (e.g., tuner part 111, image part 114, etc.) through each bus line 117 of the associated product (e.g., TV, camcoder, etc.).

In addition, for individual IC control as aforementioned, identification number is given to every IC. Thus, if a particular IC needs to be searched out, corresponding identification number of the IC can easily retrieve it.

At this time, as for the IC identification number, a manufacturing number of each IC issued by IC manufactures is preferably used because an IC designer who shares data on the corresponding IC may be confused if each manufacturer arbitrarily designates the IC identification number.

Moreover, the relay service company network 300 includes DB (Data Base) 320 for classifying and saving setup requesting data and setup problem solving data into its own kind, the data being received from the IC designer network 200 at the request of IC setup from each manufacturer network 100, respectively.

The relay service company network 300 also comprises web server 310 that is connected to the data saving DB 320, shares data, and provides the corresponding data in the DB through web page whenever there is a request for the data.

Here, URL (Uniform Resource Locator) data is saved in the web server 310, so if necessary, the relay service company network 300 can be connected to the corresponding IC designer network 200 at any time.

Further, the relay service company network 320 comprises file server 330 for providing data on IC contents in a designated format of file.

As for the present invention, either web server 310 or file server 330 can provide the data in the DB server 320, but it is desirable to use both web server 320 and file server 330 for more convenience in data supply.

Here, data file share using the file server 330 can be accomplished through FTP (File Transfer Protocol).

In the meantime, besides the components described above, the manufacturer network 100 and the IC designer network 220 further includes an equipment for internet to enable on-line connection to the relay service company network 300.

The IC designer network 200 also provides data on different kinds of IC to every manufacturer, administrates a site for receiving data requests for the corresponding IC data, and, to this end, comprises DB 220 and 230, respectively, for saving data on a distributor of web server 210 and IC, and data on each IC.

With reference to FIG. 3, the following describes a procedure for solving an IC setup error using the system of the first example according to the present invention.

To begin with, if each part needs setting to a product, an IC setup manager of the product manufacturer (hereinafter, it is referred to as a setup manager) performs a setup for each IC (hereinafter, it is referred to as setup) using managing system 120.

In order to accomplish the above, the managing system 120 should be connected to a product system 110. Moreover, every IC in the product system 110 should be preset through micom 118 to be well controlled, and according to this, the micom 118 sends a signal for performing IC controlling of the product through each bus line.

After the above procedure, the setup manager connects to the corresponding IC using identification number and carries out the IC setup (S112).

Namely, by operating the managing system 120 and transmitting a signal for the corresponding IC setup through each bus line, the relevant IC setup is carried out.

At this time, connecting to the corresponding IC can be easily done by using an identification number of the IC.

Meanwhile, during the IC setup procedure aforementioned, if there is an error on a particular IC setup the setup manager should find out the IC associated with the error (S113).

The detecting step (S113) is easily accomplished by confirming an identification number of the IC that caused an error.

In this manner, once the IC with an error is soon detected (S113), the setup manager, based on each IC manual, changes the IC register value, and performs the corresponding IC setup (S114).

However, if the IC error is not fixed despite the repeated setup procedure (S114), the setup manager transmits every kind of data of the IC together with the IC error content to the relay service company network 300 through the relevant manufacturer network 100 that is connected to managing system 120 (S115).

In the transmitting step (S115), for more effective correction work of IC error by an IC designer, the setup manager is suggested to transmit IC data having an error as well as other data of ICs that are concurrently operated with the IC with the error.

Also, although the data transmission can be done through web server 310 of a relay service company, it is more desirable to use file server 330 of the relay service company because the data is directly transmitted to a desired place, which is necessary for classifying and renewing incorrect data more effectively.

And, in case that IC error content and IC data should be saved on the file server, the different kinds of data first should be codified based on the agreements and a relay service company in order to prevent any illegal data leakage to other network.

In the meantime, when relay service company network 300 receives the IC error content as above, it figures out the corresponding content and at the same time, checks whether or not there is the same kind of data for each error content in data saving DB 310 (S116).

If there is the identical data with the transmitted data on the error from manufacturer network 100, the relay service company network 300 encloses the corresponding data and returns it to the manufacturer network 100, or provides the data through web page (S117).

However, if the same error content does not exist in data saving DB 320, the transmitted data on IC error and the IC data are saved for the time being, and later it is sent to the corresponding IC designer network 200 (S118).

At this time, web server 310 in relay service company network 300 can be connected to the corresponding IC designer network 200 according to the corresponding URL data of a presaved IC designer network, and the required data is received through a data requisition section on a site administrated by an IC designer.

After the above procedure, the corresponding IC designer receives data on error from IC setup, changes register value of the corresponding IC based on the error content and IC data in order to fix the error, and transmits the corrected data back to the relay service company network 300 (S119).

Here, the relay service company saves the corrected data in file server 330 and simultaneously, classifies and saves IC error contents according to the corresponding data and the corrected data according to the contents into data saving DB 320, and then transmits to managing system 120 of the corresponding manufacturer network 100.

Later, a setup manager receives the corrected data following the above procedure, and performs re-setup for the corresponding IC based on the transmitted data (S121).

If there is another error during the re-setup, it is fixed by repeating the same procedure described above after adding the error content.

On the other hand, the relay service company network 300 as illustrated in the first example of the present invention is not absolutely required.

Figure 4:
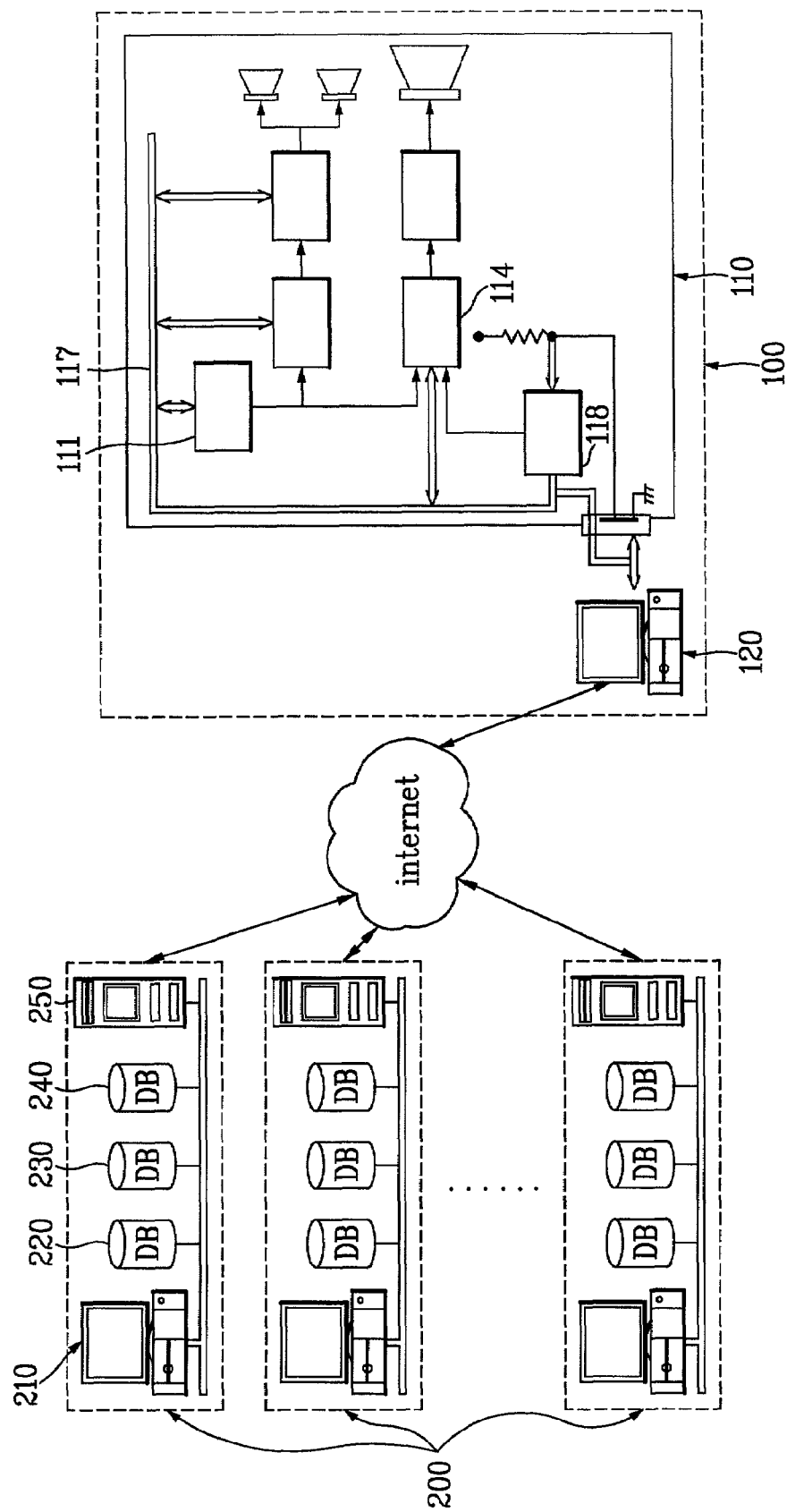
FIG. 4 illustrates a structural view of a remote control system according to a second example of the present invention.

The functions and configuration of the relay service company can be combined to either individual IC designer network 200 or manufacturer network 100, and this is reflected in a remote control system according to a second example of the present invention with reference to FIG. 4.

In other words, the remote control system in the second example of the present invention comprises manufacturer network 100, the manufacturer producing every kind of products; and, IC designer network 200, the designer designing ICs for the products, and the each network 100, 200 forms a mutual on-line state through internet, thereby enabling data transmission and data share to both directions.

Here, the manufacturer network 100 includes managing system 120 that performs setup for IC of each product according to the operation of a setup manager.

The managing system 120 is connected to micom 118 of each product system 110, and transmits a signal for IC control of the corresponding part (e.g., tuner part 111, image part 114, etc.) through each bus line 117 of the associated product (e.g., TV, camcoder, etc.).

In addition, the corresponding IC can be retrieved according to a designated identification number given to each IC for individual IC control. More preferably, as explained in the first example, a manufacturing number of each IC issued by IC manufacture is used for an identification number the IC to make it easier to distinguish the IC.

Also, IC designer network 200 comprises DB 220, 230 for saving client data including history of a manufacturer and products by the manufacturer; and, DB 240 for saving data on IC error content and problem solving data for the error according to its own kind.

Moreover, the IC designer network 200 includes web server 210 for providing every kind of data saved in each DB 220, 230,and 240 if there is a data request from a manufacturer using the corresponding IC.

Preferably, the IC designer network 200 includes file server 250 for providing data on IC error not only for displaying on web page but also presenting as a data file. At this time, data file share through the file server 250 can be accomplished using FTP (File Transfer Protocol) service.

However, the above-described DB 240 for IC error content and problem solving data, the web server 210, and the file server 250 do not have to be established on IC designer network 200 only, but they can be established on each manufacturer network 100 as well.

In addition, by saving URL (Uniform Resource Locator) data of individual IC designer network on a server of manufacturer network, they can be connected to every IC designer network 200 whenever necessary.

Figure 5:
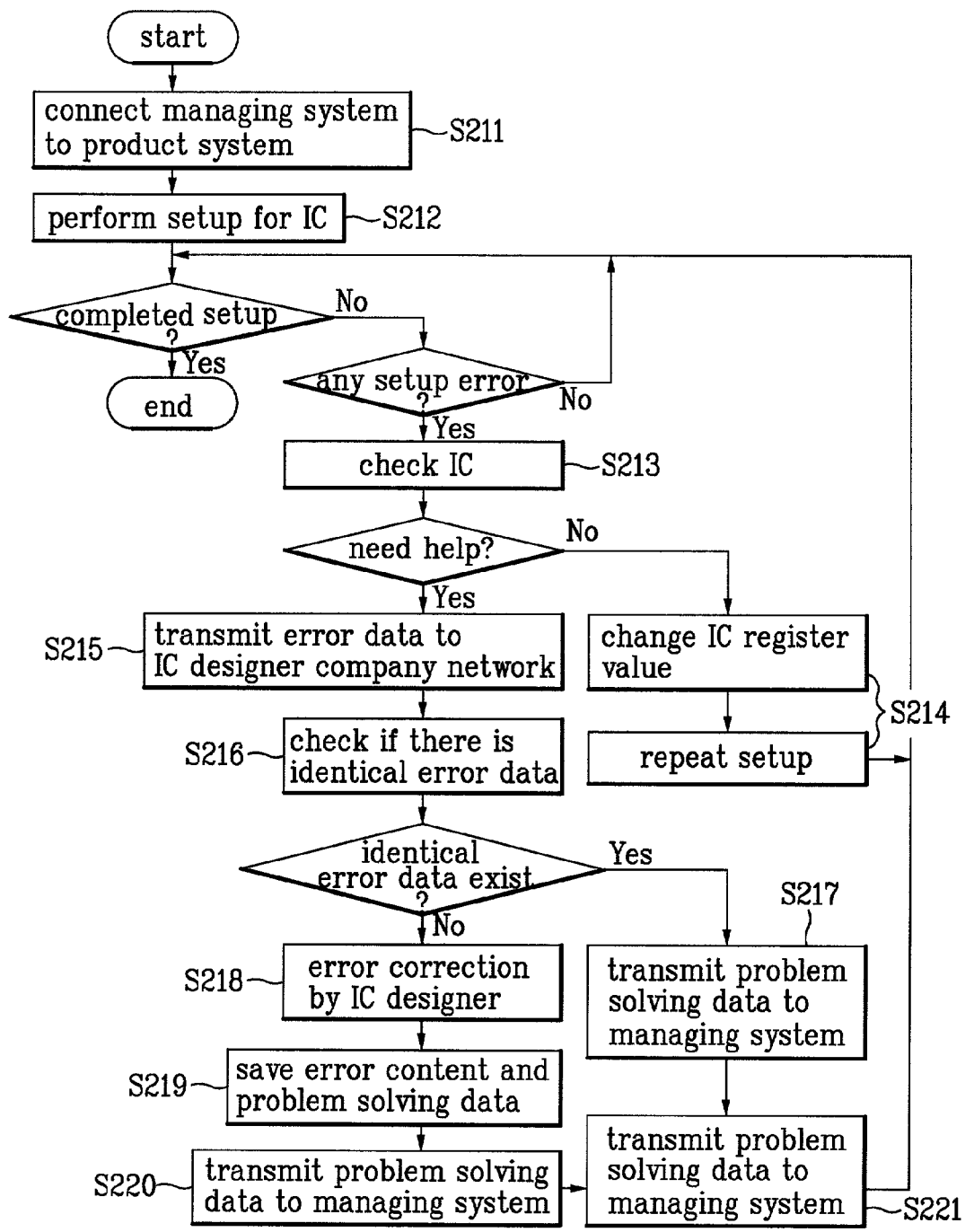
FIG. 5 is a flow chart illustrating a method for operating remote control system according to a second example of the present invention.

The following describes a procedure for solving IC setup error using the system of the second example according to the present invention with reference to FIG. 5.

First of all, for setting a part to a product, a setup manager of a manufacturer performs IC setup using a managing system.

To this end, the managing system 120 first should be connected to product system 110.

And, each IC in the product system 110 is pre-set for controlling through micom 118.

Later, the setup manager connects to the corresponding IC using an identification number, and performs setup for the IC (S212). Namely, by operating managing system 120 and transmitting a signal for setup on the corresponding IC through each bus line, the setup manager carries out setup for the corresponding IC.

If there is an error during the procedure, the setup manager detects IC associated with the error (S213).

Once the setup manager finds out the IC with an error, he or she changes register value of the IC based on a manual for the corresponding IC, and repeats setup for the corresponding IC.

However, if the IC error is not fixed despite of the procedure aforementioned, the IC error content together with other data of the IC are transmitted to IC designer network 200 through the corresponding manufacturer network 100 that is connected to managing system 120 (S215).

In this manner, IC designer receives the IC error content and other data of the IC from manufacturer network 100, figures out the corresponding contents, and simultaneously, checks whether or not there is the same kind of error data in DB 240 (S216).

Here, if there is the data with the same history according to required content from manufacturer network 100, the IC designer network 200 returns the corresponding data with others to managing system 120 in manufacturer network 100.

Furthermore, if there is an additional data request from a manufacturer, the corresponding data can be provided through webpage by displaying the data.

However, in case that there is no data with the same kind of error in DB 240, the transmitted IC error content is saved DB 240 and then transmitted to the corresponding IC designer.

The IC designer analyzes the transmitted IC error content enclosed with other data of the IC and corrects the error (S218).

The corrected IC data by the IC designer together with the IC error content is saved in data saving DB 240 in IC designer network 200 and then transmitted to manufacturer network 100.

Using the corrected data, a setup manager of a manufacturer conducts re-setup for the corresponding IC (S221).

If there is another error during the re-setup, the problem solving procedure aforementioned is repeated to fix the error.

On the other hand, in the first and second example of the present invention, in which corresponding IC designer helps a manufacturer solve IC setup problems through on-line, it is always possible that the IC designer and a setup manager of the manufacturer have communication difficulties, or that the same procedure for fixing the identical errors during the IC setup is repeated over and over.

To take care of the above-described problem, the present invention provides a system and an method for operating the same in a third example, in which IC designer and setup manager communicate in real time mode over the internet for facilitating work process in overall.

Figure 6:
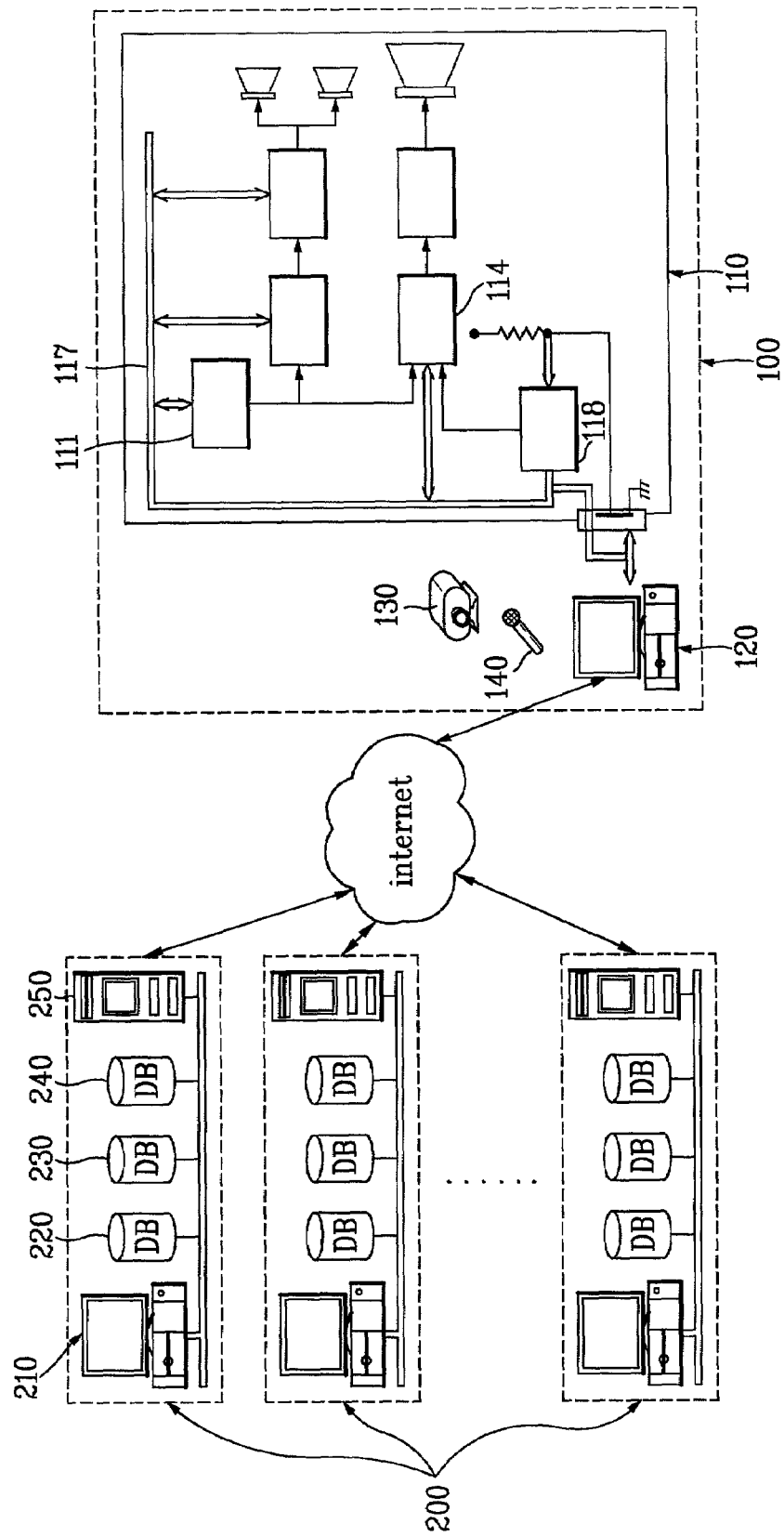
FIG. 6 illustrates a structural view of a remote control system according to a third example of the present invention.

FIG. 6 is a structural view for illustrating configuration of the system according to the third example of the present invention.

Here, although the system of the third example is basically same with that of the second example, manufacturer network 100 in the third example further includes PC camera 300 and microphone 140.

The PC camera 130 transmits screen of managing system 120 in manufacturer network 100 in real time, and simultaneously, the microphone 140 transmits voice of a setup manager.

In addition, there are programs for real-time video communication or real-time chatting between the IC designer network 200 and the managing system 120 of the setup manager. The real-time video communication or chatting should be limited to IC designers and setup designers only.

Figure 7:
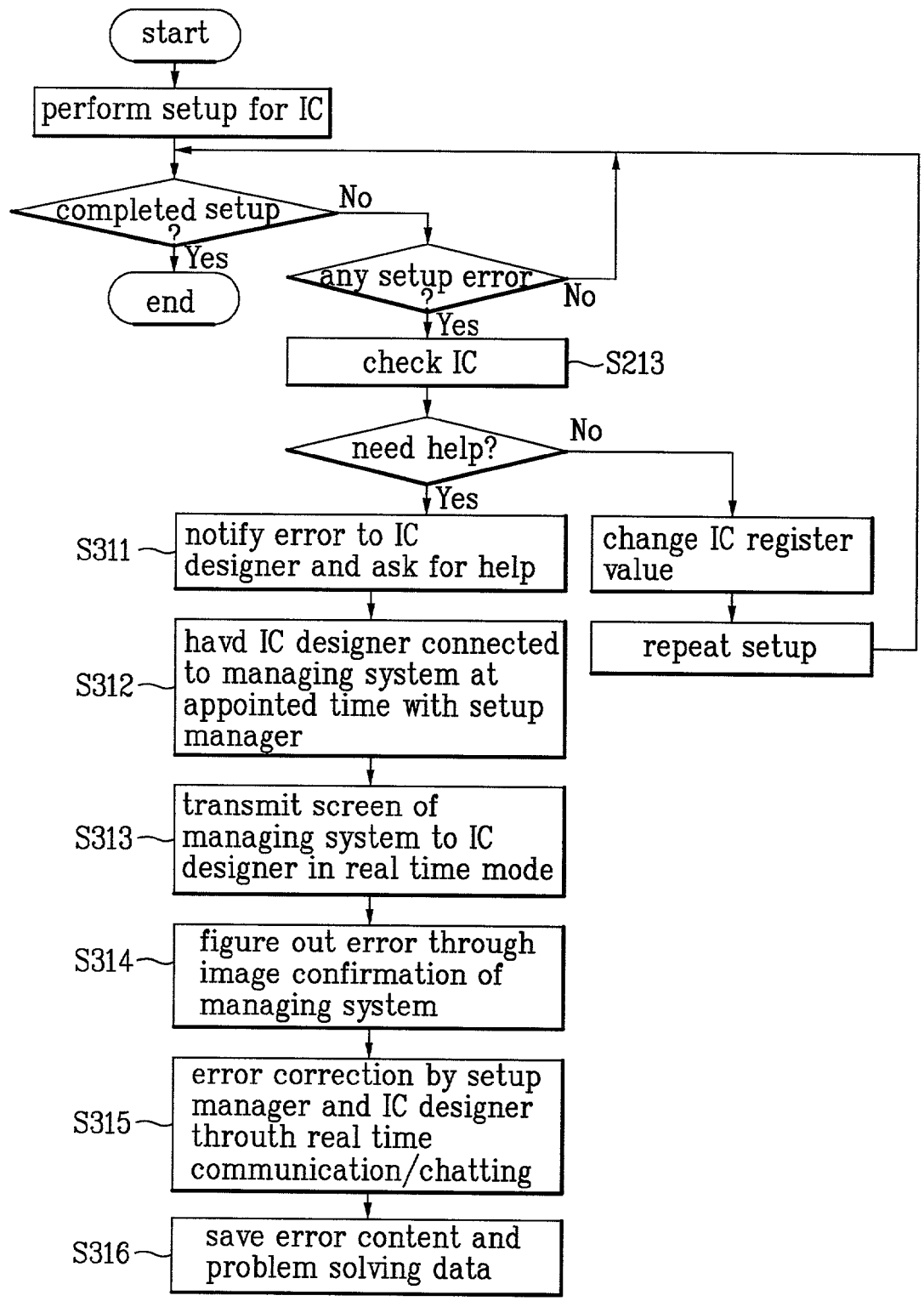
FIG. 7 is a flow chart illustrating a method for operating remote control system according to a third example of the present invention.

With reference to FIG. 7, it is now explained an administration procedure of the third example according to the present invention.

First of all, if there is an error during IC setup, a setup manager notifies this incident to a IC designer.

At this time, the notification of the error can be done through wire/wireless communication or mail. More preferably, it can be accomplished by establishing a separate site including webpage that notifies all kinds of requests in web-server 210 for IC designer network 200.

Therefore, the setup manager, using manufacturer network 100, connects to the corresponding site of an IC designing company, notifies the IC setup error, and asks for help to fix the problem (S311).

Here, managing system (or, a separate server) in the manufacturer network 100 contains URL data regarding sites that are administrated by IC designers, so it is possible to connect to the corresponding IC designer.

When IC setup request is met, an IC designer checks the content of a request that is registered to a request web page on web server 210, and connects to a relevant manufacturer network 100 at the appointed time with a setup manager (S312).

At the same time, the setup manager turns image camera 130 on, and transmits the screen of managing system that displays whole procedure of IC setup to the IC designer in real time mode (S313).

At this time, the managing system 120 displays the IC setup procedure, register value of the IC, and register values of other ICs that are connected to the IC, etc. The IC designer then checks in real time mode whether the corresponding IC setting is precisely done (S314).

Moreover, the setup manager and the IC designer conduct real-time image communication or real-time chatting each other using image camera 130 and microphone 140 and exchange opinions regarding the IC setup procedure. Simultaneously, the IC designer informs the IC setup manager on change of register value to facilitate the corresponding IC setup in real time mode (S315).

During the procedure, the IC designer classifies data on IC setup error that is requested by the IC setup manager and problem solving procedure, or corrected data into its own kind, and saves the data into data saving DB 240 in his or her own network 200 (S316).

In result, the system and the operating method therefor in the third example of the present invention greatly reduces extra work due to repetition of data exchange.

Meanwhile, the IC designer in the third example does not necessarily confirm the error only based on the screen of managing system transmitted through an image camera.

Instead, the managing system is directly connected to the IC designer network, and displays the operating screen of the managing system 120 through a display device included in the IC designer network, thereby helping the IC designer directly check the error in real time mode.

However, the operating method of the system illustrated in the third example may be inconvenient for the IC designer and the setup manager for exchanging data.

Accordingly, the present invention provides a system and a method for operating the same in a fourth example, in which an IC designer directly controls a managing system in a manufacturer network and performs IC setup for the corresponding IC.

Figure 8:
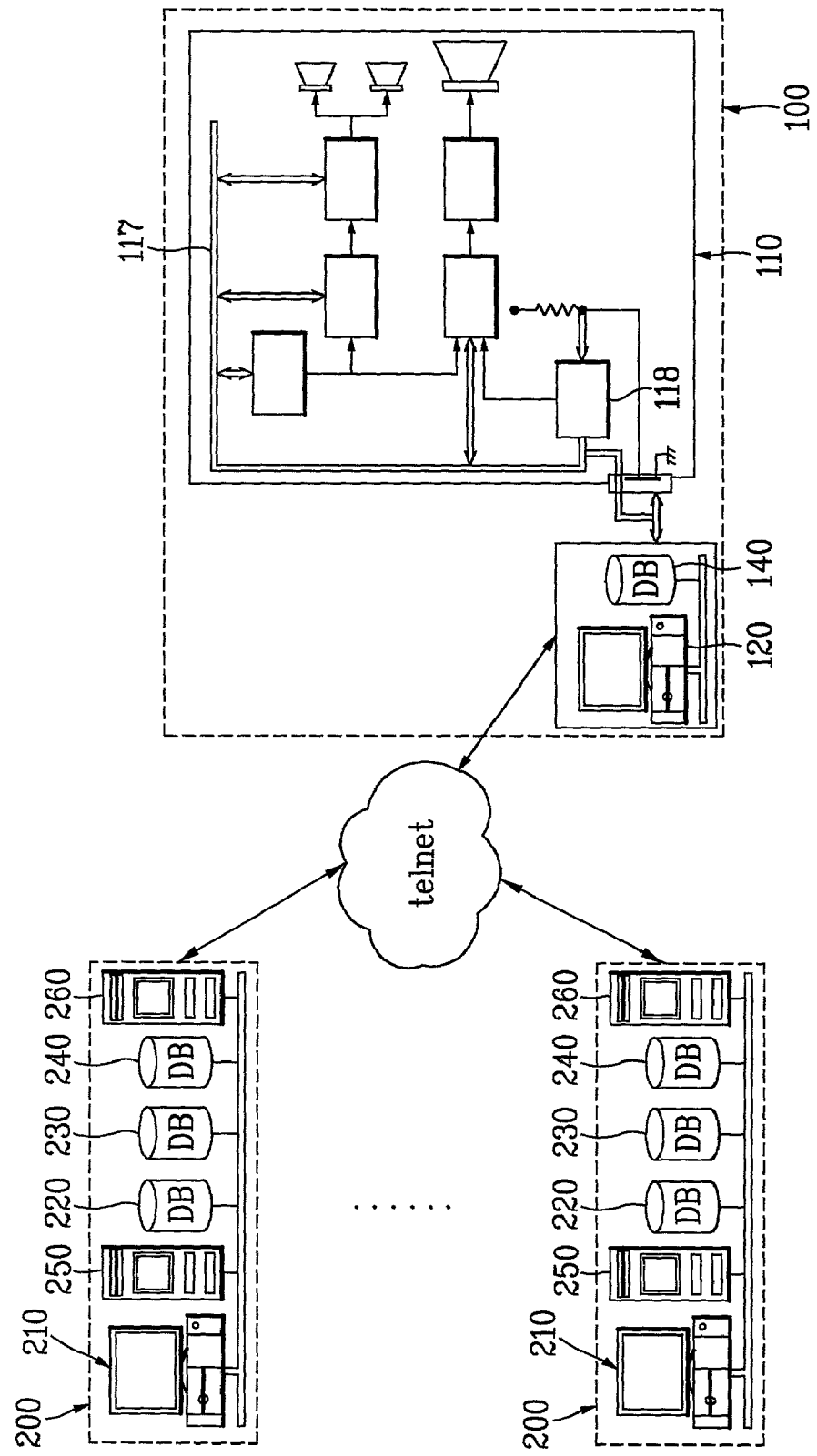
FIG. 8 illustrates a structural view of a remote control system according to a fourth example of the present invention; and, FIG. 9 is a flow chart illustrating a method for operating remote control system according to a fourth example of the present invention.

Basically, the configuration of the system in the fourth example is very similar to that of in the second example, except that a IC designer, as illustrated in FIG. 8, can directly control managing system 120 in manufacturer network 100.

In order to accomplish the above, managing system 120 in manufacturer network 100 should be connected to product system 100.

However, the managing system 120 and the product system 110 do not have to be connected to each other all the time but only upon the request of an IC designer.

Also, the managing system 120 is established in such manner that a signal for performing IC control of the produce can be possible through each bus line 117 being connected to each bus line 117.

Manufacturer network 100 is connected to the managing system 120 and includes DB 140 where classified data by every IC designer is saved.

And, managing system 120 of IC designer network 200 and manufacturer network 100 is formed to utilize telnet service, thereby IC designer remote from a manufacturer can directly connect to the managing system 120 and proceed operation In addition, the IC designer network 200 includes PLC (Programmable Logic Controller) 260, which makes it possible for the IC designer to change register value of a remote IC whenever necessary.

At this time, only legally allowed IC designers can connect to the managing system 120 in the manufacturer network 100 using LOGIN step to the corresponding IC only.

The LOGIN step permits an IC designer to connect to the corresponding IC in an early stage, thereby preventing leakage of other IC data.

In a similar manner, ID (Identification Number) and password, or authentication can be used. However, since these are already in general use, any details are omitted here.

However, there are also provided solutions for any problems or difficulties an IC designer may face especially when he or she wishes to connect to the corresponding IC and other IC data that are associated or correlated to the corresponding IC for a product operation. Further, whenever necessary, the IC designer can directly connect to other IC more effectively and generally.

Figure 9:
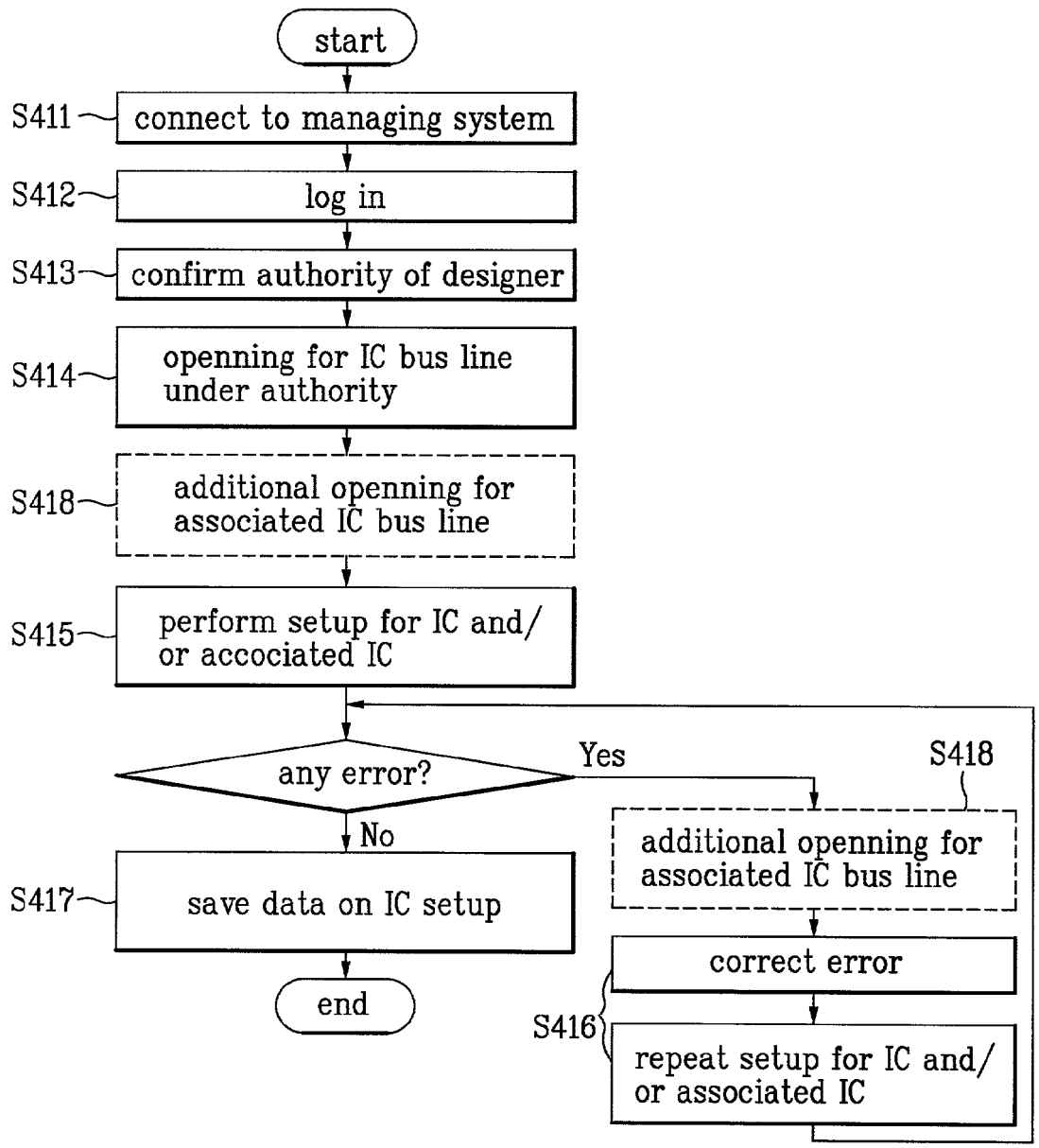

The operating procedure for a system in the fourth example of the present invention is explained with reference to a flow chart illustrated in FIG. 9.

To begin with, IC designer, using his or her own network 200, connects to managing system 120 in manufacturer network 100.

Here, corresponding web page to the managing system 120 performs LOGIN procedure under authority of the IC designer (S412).

Thus, the IC designer performs LOGIN on the managing system 120 in the corresponding product using pre-designated personal ID and password by a manufacturer.

In order for the IC designer to connect to the corresponding IC only, different authority should be given.

When a LOGIN request is met following the manner aforementioned, the managing system 120 confirms data of an IC designer who wishes to log in through DB 140 connected to the managing system 120, and based on the data, it opens bus line 117 that is connected to corresponding IC (S414).

Here, the IC designer data is actually saved in DB 140 in a manufacturer network at the purchasing time of a corresponding IC.

Moreover, authority given to the IC designer together with authority to setup a corresponding IC includes authority for confirming data on other ICs that are concurrently operated with the corresponding IC according to its kind and operating purpose.

Therefore, when the IC designer connects to the managing system 120 following the procedure described above, he or she performs setup for the corresponding IC by remote controlling the managing system 120.

At this time, the remote controlling of the managing system 120 is possible because the managing system is connected to the IC designer network 200 through telnet.

And, if there is an error during IC setup, the IC designer first checks DB 140, 240, respectively, to find out whether or not there is the same error content. Afterwards, the IC designer changes register value of the corresponding IC, and corrects the IC setup error (S416).

This can be accomplished because PLC 260 is installed on the IC designer network 200.

However, this is not limited to PLC 260 installed on the IC designer network 200. Instead, the IC designer can control the PLC through telnet if the PLC is established on the managing system 120 as well.

In this way, if setup of the corresponding IC is completed, the whole procedure is saved into DB 240 in both IC designer network 200 and manufacturer network 100, respectively (S417).

The saved data is then classified into kinds of errors to be used for the same possible operation later.

Lastly, when the foregoing procedure is all completed the IC designer does log out from managing system and ends the corresponding work.

On the other hand, more preferable operating method according to the fourth example of the present invention further includes a step for opening bus line of other ICs that are associated with the corresponding IC, thereby helping the IC designer to additionally connect to others whenever necessary. FIG. 8 illustrates the additional opening step (S418), which is carried out before the corresponding IC bus line opening step (S414) or error correction/re-setup step (S416). However, if necessary, it can be re-performed optionally during the operating method in the fourth example. Also, the additional opening step (S418) can be proceeded based on self-decision of a setup manager or at the request of an IC designer, and associated IC ranges are also adjusted according to operation conditions.

Using the above additional opening step (S418), the IC designer can perform flexible setup (S415, S416) on the corresponding IC and/or other relevant IC upon the request, and consequently the setup can be more effectively done.

Here, the fourth example does not say that only an IC designer can connect to managing system of the corresponding manufacture in order to facilitate operation. Instead, as for IC setup, another IC designer, the IC being related to the corresponding IC, can simultaneously connect to a manufacturer network so that two (or more) designers can exchange IC data necessary for the IC setup.

In this case, since the IC designer who actually performs setup can perform the operation more actively, receiving data of other IC in real time mode.

Accordingly, the system for controlling remote IC according to the present invention makes it possible for an IC designer or a setup manager to perform IC setting over the internet, thereby saving a great deal of time especially for the IC designer and minimizing the frequency of visits of the IC designer with the manufacturers using the corresponding IC.

In addition, the present invention provides each IC setup error contents in DB, helping a plurality of IC users to share necessary data. Consequently, an IC designer does not have to perform the same operation over and over any longer whenever there is a data request for IC setup with the exactly same content. Also, the present invention improves workability of setup managers in general by actively acquiring data on different kinds of setup errors.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for operating a system for controlling s remote Integrated Circuit (IC) using the internet, the method comprising:

transmitting data of an IC setup error, which is made during an IC setup procedure for setting an IC of a product, to a relay service company network through a corresponding manufacturer network, the relay service company network storing a network address for each of a plurality of IC designer networks, and said transmitting includes transmitting the data of the IC setup error with information corresponding to one or more ICs that operate with the IC for which the setup error occurred;

transmitting the data from the relay service company network to one of the plurality of IC designer networks corresponding to the IC of said product that experienced the IC setup error, said transmitting the data from the relay service company network including (a) searching a database for a network address of said one of the IC designer networks and (b) transmitting the data to said one of the IC designer networks based on the network address produced by the search;

analyzing and correcting the data of the IC setup error at said one of the IC designer networks;

transmitting the corrected data to the relay service company network;

transmitting the corrected data from the relay service company network to the manufacturer network; and repeating the corresponding IC setup through a managing system in the manufacturer network using the transmitted corrected data.

2. The method of claim 1, wherein the relay service company network further comprises:

classifying and saving the transmitted corrected data of the IC setup error and problem solving data, according to the error, in the Data Base.

3. The method of claim 1, wherein the relay service company network further:

checks whether or not there is correction data relevant for a data request, regarding the Integrated Circuit (IC), that is transmitted to the relay service company network from the manufacturer network, and provides the correction data to the manufacturer network if there is a request for the correction data.

4. The method of claim 1, wherein the network addresses of the IC designer networks are not stored in the manufacturer network.

5. The method of claim 4, further comprising:

transmitting IC identification information to the relay company service network, wherein the relay company service network searches the database based on the IC identification information to determine the network address of said one of the IC designer networks.

6. The method of claim 5, wherein the IC identification information is an ID number assigned to the IC by a manufacturer of the IC.

7. The method of claim 6, wherein the ID number is different from an identification number assigned to the IC by a manufacturer of the product contain the IC.

8. The method of claim 1, further comprising:

storing correction setup error data for a plurality of ICs in the relay company service network, and wherein said second transmitting includes:

determining whether correction data for correcting the setup error of the IC for said product is stored in the database or another storage device of the relay company service network; and transmitting the data of the IC setup error from the relay service network to said one of the IC designer networks when said correction data is determined not to be stored in the database or another storage device of the relay company service network.

9. The method of claim 8, further comprising:

receiving, in the relay company service network, the corrected data from said one of the IC designer networks;

storing the corrected data in association with the IC setup error in the database or said another storage device for future use; and transmitting the corrected data to the manufacturer network.

10. The method of claim 8, wherein the correction data is stored in the relay company service network in encoded form.

11. The method of claim 1, wherein the manufacturer network is connected to the relay company service network through the internet, and the relay company service network is connected to said one of the IC designer networks through the internet.

12. The method of claim 1, wherein the network address includes a Uniform Resource Locator (URL).

* * * * *